Aug. 15, 1961  G. HERZOG  2,996,619
RADIOACTIVITY WELL LOGGING
Filed Dec. 21, 1956
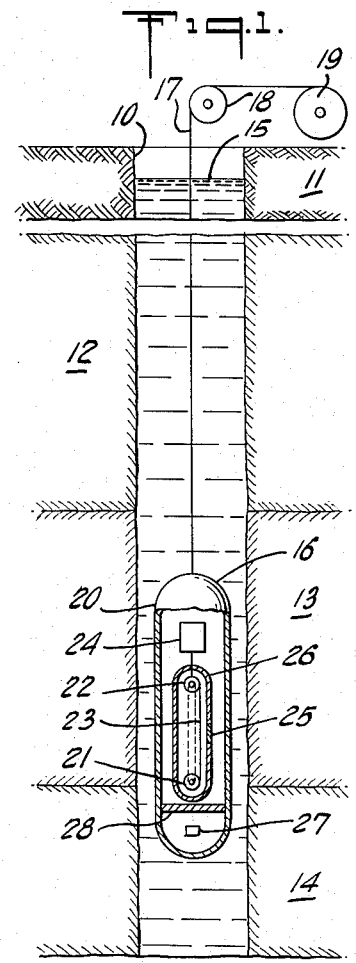
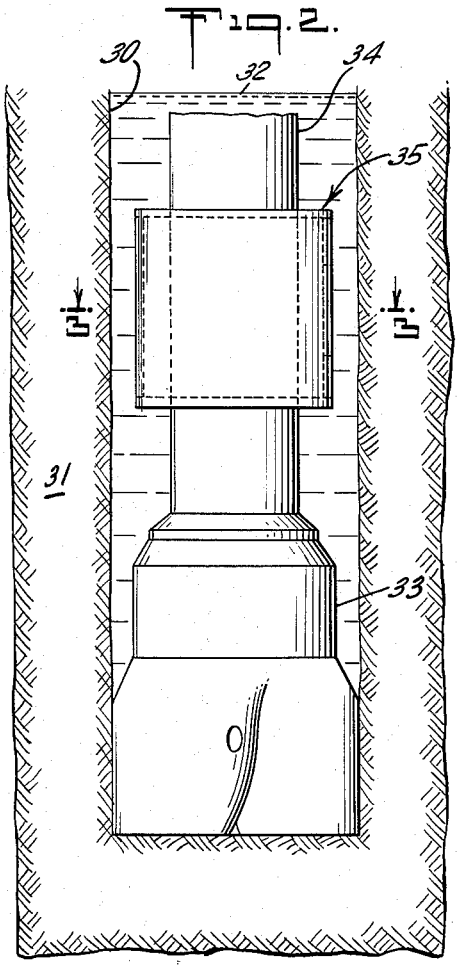
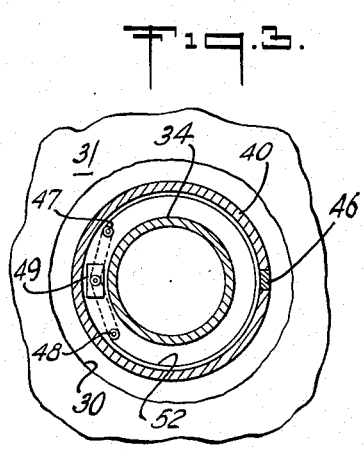
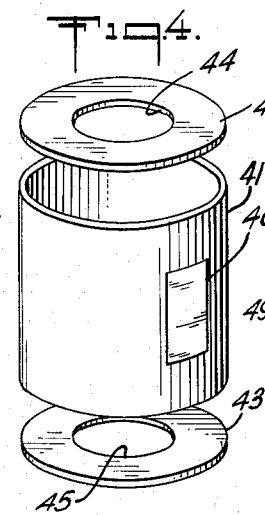
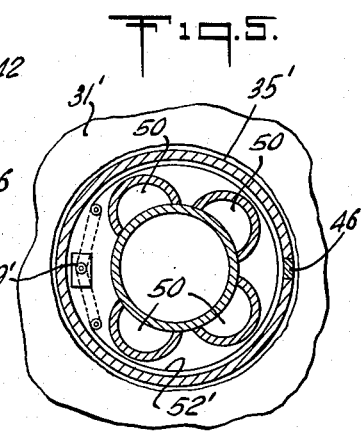

# United States Patent Office 2,996,619
Patented Aug. 15, 1961

2,996,619
RADIOACTIVITY WELL LOGGING
Gerhard Herzog, Houston, Tex., assignor to
Texaco Inc., a corporation of Delaware
Filed Dec. 21, 1956, Ser. No. 629,963
9 Claims. (Cl. 250—83.3)

The present invention relates generally to the detection of penetrative radiation and, more particularly, to the detection of penetrative radiation such as gamma rays on photographic film, or the like. The invention is of particular utility as applied to the detection of penetrative radiation in a self-contained well-logging instrument.

Various means have been suggested for detecting penetrative radiation in such manner as to avoid the necessity of transmitting an electric signal from a detecting apparatus in a well bore to an indicating or recording means at the surface. For example, it has been proposed in the past to dispose photographic film in a well bore in such manner as to be fogged by penetrative radiation impinging thereon. It has also been proposed to detect penetrative radiation by means of a conventional electrical pulse producing type detector and to employ the detector output signal to control an electrically powered light source which, in turn, is employed to fog a film strip in accordance with the detected signal. Such apparatus is shown for example in copending patent application S.N. 430,853, filed May 19, 1954 by A. D. Garrison.

Accordingly, it is a general object of the present invention to provide improvements in the detection of penetrative radiation on photographic film.

It is a more particular object of the present invention to provide improved means for selectively fogging a photographic film in response to penetrative radiation impinging thereon.

It is a further object of the invention to provide an improved self-contained bore hole logging instrument for the measurement of gamma radiation.

It is still a further object of the present invention to provide improved self-contained bore hole logging apparatus for conducting a radioactivity well log involving the detection of penetrative radiation and which may be carried out during the course of drilling the well.

Briefly stated, in accordance with one aspect of the present invention, there is provided penetrative radiation detection apparatus comprising a photographic film having a gamma-to-beta ray converter adjacent thereto, and so positioned with respect to one another that beta rays produced by gamma rays impinging upon the converter, may impinge upon and fog the film as an indication of the detected gamma rays. Means are preferably provided for moving the film past the converter at a predetermined rate in order to afford means for continuous detection over a relatively long period of time.

Considered more particularly, the invention is concerned with the provision of a logging instrument including a housing adapted to be lowered into a well bore and which contains means for mounting a photographic strip and a detector adjacent thereto comprising a gamma-to-beta converter disposed in the path of gamma radiation emanating from the earth formations along the bore hole. Means are provided for moving the strip past the converter at a predetermined rate in accordance with a determinable schedule in order that the film position may be correlated with the position of the instrument in the well bore.

A further aspect of the invention is concerned with the provision of such apparatus in combination with a well-drilling tool, whereby it is possible to log the bore hole during the time that the drill is in the well in course of drilling of the bore hole.

For additional objects and advantages and for a better understanding of the invention, attention is now directed to the following description and accompanying drawings. The features of the invention which are believed to be novel are particularly pointed out in the appended claims.

In the drawings:

FIGURE 1 is a vertical elevation through a portion of a bore hole showing a well logging instrument suspended therein and which is constructed in accordance with principles of the invention;

FIGURE 2 is a vertical elevation through a portion of a bore hole showing therein an earth drill having affixed thereto a logging-while-drilling apparatus constructed in accordance with principles of the invention;

FIGURE 3 is a cross-sectional view through the lines 3—3 of the apparatus shown in FIGURE 2;

FIGURE 4 is an exploded perspective view of a portion of the logging apparatus shown in FIGURE 2; and, FIGURE 5 is a cross-sectional view of still another form of logging-while-drilling apparatus employing principles of the invention and which is taken along the line 3—3 of FIGURE 2.

Referring now to FIGURE 1, there is shown a bore hole 10 passing through a series of earth formations 11—12—13—14 and containing the usual bore hole fluid 15 which may comprise drilling fluid and/or oil or water, for example. Positioned within the bore hole 10, there is shown a logging instrument 16 suspended by means of a cable 17. At the surface of the earth there is shown diagrammatically a measuring device 18 for indicating the length of the cable 17 extending into the bore hole 10 at any given time. A take-up reel 19 is shown for storing that portion of the cable 17 not lowered into the bore hole. Timing and recording means (not shown) may be located at the surface for correlating the depth of the instrument 16 in the bore hole 10 with time.

The logging instrument 16 comprises a self-contained unit for recording gamma radiation within the bore hole at various locations along its depth. The instrument 16 comprises an outer casing 20 constructed in accordance with known principles to withstand the conditions of pressure encountered in a bore hole and having mounted within it a gamma radiation detection apparatus embodying principles of the invention. The detection apparatus, per se, comprises means for mounting a strip of photographic film including storage and take-up spools 21 and 22 upon which are mounted the film 23 and film drive means including a motor 24 for driving the take-up spool 22. The motor 24 may be a spring-wind mechanism or in certain cases an electrical motor powered by means of self-contained batteries. Adjacent the film strip 23, intermediate the storage and take-up spools 21 and 22, there is provided a gamma-ray-to-beta-ray converter member 25 suitably positioned within the housing 20 such that gamma-rays emanating from the formation adjacent the instrument 16 may impinge thereon and, likewise, suitably positioned adjacent the film strip 23 such that beta rays produced therein by the gamma rays may impinge upon a portion of the film. Generally enclosing the film strip 23, including the storage and take-up spools 21 and 22, there is provided a gamma-ray shield 26 which may be in the form of a lead shielding member of adequate thickness to prevent direct fogging of the film 23 by gamma radiation in the bore hole. It is to be noted that the thickness and construction of the housing 20 opposite the gamma-ray-to-beta-ray converter should be such as not to interfere substantially with the passage of gamma radiation therethrough, except to the extent that a portion of the housing may comprise the converter itself.

The gamma-to-beta converter comprises a sheet of material that is capable of interacting with penetrative radiation of the high energy photon type, e.g., gamma rays, to occasion a release of less penetrative radiation, e.g., beta rays. The converter should preferably be formed of material as determined by the energy range of the gamma rays to be detected. In general, heavier materials, i.e., of higher atomic number, are preferred for converting lower energy gamma rays and lighter materials are preferred for converting higher energy gamma rays.

The thickness of the converter material should be adequate to provide effective translation of incident penetrative radiation to less penetrative radiation such as beta rays. Nevertheless, the converter material should be sufficiently thin to permit the lower energy beta rays produced therein to escape to the photosensitive strip for detection.

For the detection of both scattered gamma rays and natural gamma rays, both of which are usually below 1 mev., the converter should preferably comprise a sheet of tantalum of at least 105 mg./cm.$^2$ in thickness and should preferably be at least 125 mg./cm.$^2$ and should not exceed 130 mg./cm.$^2$.

For detecting neutron-gamma rays having an energy in excess of 1 mev. and generally of the order of 2 mev. or more, the converter preferably comprises a sheet of aluminum of 400 to 500 mg./cm.$^2$.

Though generally less effective than the preferred metals given above, in the case of scattered and natural gamma rays the converter may be formed of other heavy metals similar to tantalum. For the detection of neutron-gamma rays the converter may be formed of other light metals similar to aluminum. A ferrous metal sheet, such as steel, may be employed to convert neutron-gamma rays. However, a ferrous converter is less effective than aluminum, even when it is of optimum thickness which should be somewhat thicker than an aluminum converter, on the order of 500 to 600 mg./cm.$^2$.

During the course of logging a well with the apparatus described in FIGURE 1, radiation impinging upon the gamma-to-beta converter 25 produces discrete fogging tracks on the film which may be counted upon removal and development of the film and which may be correlated with the position of the logging instrument in the well bore in order to provide the desired log. In order to facilitate correlation of the detected signal with the position of the logging instrument in the well bore, it is contemplated that the motor employed to drive the film passing the gamma-to-beta converter should be of such character as to operate at a predetermined constant rate. For further correlation purposes, a timing device may be associated with the film transport mechanism in order that the position of the film may be correlated with the position of the logging instrument by means of a further recording and timing apparatus at the surface for recording the instantaneous position of the logging instrument in the bore hole against time throughout the course of the log. As determined by the desired exposure-time of a given portion of the film strip, it is further contemplated that the film transport means may be adapted to move the film past the converter intermittently in predetermined discrete intervals.

In order to provide further versatility in the type of log being made, it is noted that the present instrument is useful in natural gamma-ray logging as described thus far, and may be adapted to the making of secondary gamma ray logs by the provision of a suitable radiation source, as for example the source 27 shown mounted in the housing 20 below the detection apparatus. The source 27 may be either a neutron source such as a mixture of radium-beryllium or polonium-beryllium in the event that it is desired to produce a neutron gamma-ray log; or, in the event that a scattered gamma-ray log is desired, the source 27 may comprise a conventional gamma-ray source such as radium, for example. In order to prevent direct radiation emanating from the source 27 from reaching the detection apparatus, a shield 28 may be interposed intermediate the source 27 and detection apparatus. In accordance with known principles, the shield may comprise a gamma-ray shield such as lead. In order to shield high intensity neutron radiation, it may comprise a combination shield which may include paraffin and cadmium layers, for example, in accordance with known principles.

Referring now to FIGURE 2, there is shown a portion of a drilling hole 30 through a portion of an earth formation 31 and having the usual drilling fluid 32 contained therein. A drill bit 33 is positioned at the base of the hole 30 and is securely affixed to a section of drill pipe 34 which may be rotated at the surface in known-manner in order to drive the drill 33. Slightly above the drill bit 33, there is affixed to the drill pipe 34 a logging-while-drilling instrument 35 involving principles of the invention. The logging apparatus 35 functions in accordance with principles as discussed above in connection with the apparatus of FIGURE 1.

The details of the logging-while-drilling apparatus 35 may be better appreciated by referring now to FIGURE 3, wherein the apparatus is shown in cross-sectional view. The apparatus 35 includes a generally cylindrical housing 40, corresponding generally to the housing 20 of the apparatus shown in FIGURE 1. The housing 40 may be best seen by referring further to FIGURE 4 where it is seen to comprise a generally cylindrical body portion 41, and upper and lower generally annular end-members 42 and 43. The end members 42, 43 are provided with cylindrical openings 44—45, respectively, through which the drill pipe 34 may be positioned. The housing 40 may be formed of shielding material of sufficient thickness to prevent gamma radiation from passing from the formation to the inside during a drilling operation. A gamma permeable detection window 46, which may also comprise the gamma-to-beta converter, is shown positioned near the top of the member 41, as shown in FIGURE 4. Within the housing 40, as may be best seen by referring back to FIGURE 3, there is positioned a photographic film strip 52 mounted to transport means including take-up and storage spools 47 and 48 for moving it past the detection window, including 46 the gamma-beta converter. A film drive 49 is shown schematically coupled to the film transport mechanism in order to cause the film to move past the gamma-beta converter at a predetermined rate, as discussed above in regard to the apparatus of FIGURE 1.

It is to be understood that a suitable source (not shown) together with appropriate shielding means may be positioned within the logging-while-drilling apparatus 35 in order to provide a neutron-gamma or gamma-gamma log as discussed above in regard to the embodiment of FIGURE 1.

During the course of drilling a well, the gamma-ray detection apparatus 35 may be set in continuous operation at a predetermined rate and the movement of the photographic strip past the gamma-to-beta converter may be recorded against time. The record may be made directly on the strip itself. Upon removal of the strip from the well, the film is developed and may be correlated against a record of the time and depth at which the drilling proceeds through the earth in order to determine the radiation detected at various places along the well bore.

It is noted, with particular regard to FIGURES 2 and 3, that the circumference of the apparatus 35 is somewhat less than that of the drill bit 33 at its widest portion. There is thus provided access for the drill fluid pumped down through the drill pipe to the bit 33 to circulate up past the apparatus 35 to the surface and to carry cuttings along with it.

Referring now to FIGURE 5, there is shown a modified form of the apparatus of FIGURES 2 and 3 illustrating a logging while drilling apparatus 35′, similar to the apparatus 35 of FIGURES 2 and 3, except that it is of greater circumference, approaching closer that of drill bit 33, and including a plurality of conduits 50 extending along the axis of the drill pipe 34 adjacent the drill pipe 34 and being of appropriate size to conduct drilling fluid and drill cuttings from the bit 33 upwardly to the surface in accordance with the usual practice of drill fluid circulation. This apparatus affords the advantage of maintaining the detection apparatus, including the gamma-to-beta converter 46' closer to the surface of the bore hole 30' thus reducing adverse effects on the detection of radiation that may be caused by the well fluid.

The elements of the apparatus shown in FIGURE 5 which correspond to those of the apparatus of FIGURE 3 are identified by identical reference numerals having a prime designation.

Obviously, many modifications and variations of the invention, as hereinbefore set forth may be made without departing from the spirit and scope thereof, and therefore only such limitations should be imposed as are indicated in the appended claims.

I claim:

1. A self-contained radioactivity bore hole logging apparatus comprising a sealed housing, means for suspending said housing in a bore hole so that it can be moved therethrough, a strip of photo-sensitive material within said housing, a gamma-to-beta converter positioned adjacent said strip, and transport means for moving said strip longitudinally past said converter at a predetermined rate, whereby beta radiation emanating from said converter in response to gamma rays will impinge upon a portion of said strip.

2. Apparatus for recording gamma-rays comprising a strip of photo-sensitive material, a gamma-to-beta converter positioned adjacent a portion of said strip in close proximity to one side thereof, and means for exposing successive portions of said strip to beta rays which emanate from said converter as the result of the impingement of gamma rays thereon during corresponding successive time intervals.

3. Apparatus for recording gamma-rays comprising a strip of photo-sensitive material, means for fogging a portion of said strip in response to gamma-rays comprising a gamma-to-beta converter positioned adjacent a portion of said strip in close proximity to one side thereof, said converter comprising a sheet of material of sufficient thickness to translate a significant portion of a selected gamma radiation flux to beta radiation and being of sufficient thinness to permit a substantial portion of the resulting beta radiation to escape therefrom to said photo-sensitive material for detection, and means for moving said strip longitudinally at a predetermined rate past said converter.

4. A self-contained radioactivity bore hole logging apparatus comprising a sealed housing of generally cylindrical configuration adapted to be mounted on a drill pipe in the vicinity of a drill bit, said housing being formed of gamma ray shielding material, a gamma radiation permeable window positioned in the side of said housing, said window including a gamma-to-beta converter, means for mounting a strip of photosensitive material within said housing adjacent the gamma-to-beta converter, said mounting means including film transport means for moving said film past said converter at a predetermined rate, whereby gamma radiation impinging upon said converter may produce beta rays that may in turn impinge upon the portion of said strip opposite said converter.

5. The apparatus of claim 4, wherein the circumference of said housing is significantly less than the circumference of the drill bit at its widest portion, thereby to permit drill fluid and cuttings to flow upwardly past said housing between the housing and the side of the bore hole.

6. The apparatus of claim 4 wherein the circumference of said housing approaches that of the drill bit at its widest portion and wherein means comprising at least one conduit are provided through said housing adjacent the drill pipe for the passage of drill fluid and cuttings from the drill bit through the housing to the surface.

7. The apparatus of claim 1 further including a source of primary radiation capable of producing secondary gamma-rays in an earth formation adjacent the housing, said source being spaced from the gamma-to-beta converter along the vertical axis of the housing.

8. The apparatus of claim 1 wherein said converter comprises a tantalum sheet whose thickness is in the range of 105 milligrams per square centimeter to 130 milligrams per square centimeter.

9. The apparatus of claim 1 wherein said converter comprises an aluminum sheet whose thickness is in the range of 400 milligrams per square centimeter to 500 milligrams per square centimeter.

References Cited in the file of this patent

UNITED STATES PATENTS

| | | |
|---|---|---|
| 2,037,924 | Rentschler | Apr. 21, 1936 |
| 2,133,776 | Bender | Oct. 18, 1938 |
| 2,220,509 | Brons | Nov. 5, 1940 |
| 2,313,310 | Arnold | Mar. 9, 1943 |
| 2,346,481 | Garrison | Apr. 11, 1944 |
| 2,409,436 | Krasnow | Oct. 15, 1946 |
| 2,733,353 | Pirson | Jan. 31, 1956 |

OTHER REFERENCES

Sourcebook on Atomic Energy, Glasstone 7.86 to 7.90.

Hoecker et al.: "Obtaining Increased $\gamma$ Sensitivity in an End-Window Geiger Tube," Nucleonics, September 1953, pages 64 and 66.